United States Patent Office 2,804,397
Patented Aug. 27, 1957

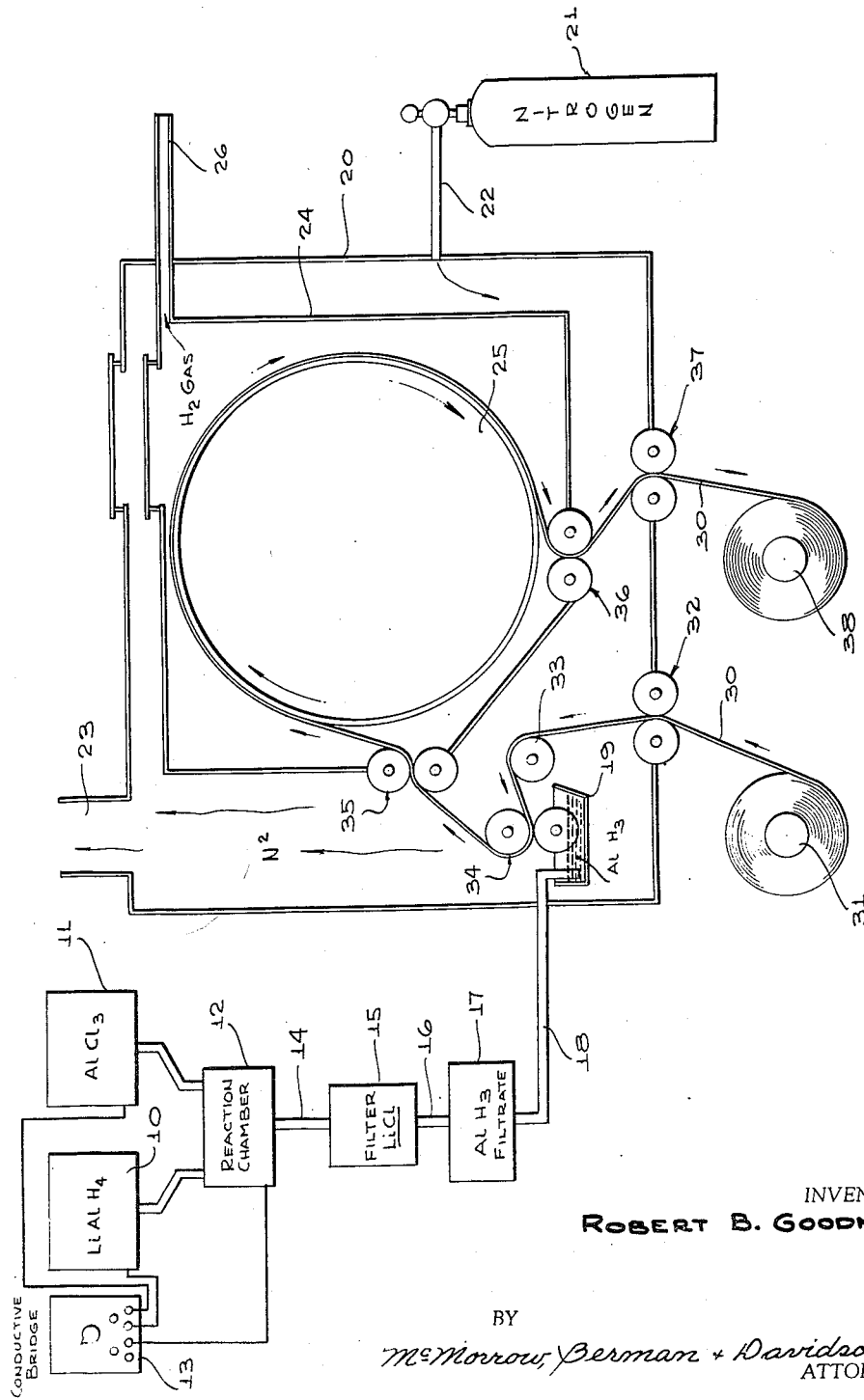

2,804,397

PROCESS FOR USING ALUMINUM HYDRIDE TO MAKE ALUMINUM METAL COATED MATERIAL

Robert B. Goodman, West Orange, N. J., assignor of one-half to Paul J. Marks, West Orange, N. J.

Application November 16, 1954, Serial No. 469,082

5 Claims. (Cl. 117—65)

This invention relates to a process for making an aluminum metal coated material.

An object of the present invention is to provide a process for making aluminum metal coated material which produces a deposition of the aluminum metal in its natural color.

Another object of the present invention is to provide a process for making aluminum metal coated material which enables the deposition of the aluminum metal in a film that exhibits a shiny reflective surface free of smokiness.

A further object of the present invention is to provide a process for making aluminum metal coated material which is positive in action, simple in execution, and commercially feasible.

Other objects and advantages of the present invention will become apparent from the following description taken in conjunction with the accompanying drawing, wherein:

The single figure diagrammatically illustrates the steps of the process of the present invention.

Briefly stated, the process of the present invention comprises coating an aluminum hydride to a material to be coated in an inert atmosphere, and subjecting the material to a temperature for decomposing the aluminum hydride to cause deposition of the aluminum metal in the form of a coating on the material. Preferably, the heat treatment step is carried out in an evacuated atmosphere while withdrawing the liberated hydrogen gas.

In carrying out the process of the invention, a solution of lithium aluminum hydride, $LiAlH_4$, is prepared by dissolving the hydride in a solvent such as diethyl ether. Stoichiometric amounts of the lithium aluminum hydride solution and of an aluminum chloride solution, $AlCl_3$, are placed in receptacles 10 and 11 respectively, and the two solutions caused to react together under controlled conditions in the reaction chamber 12. Both of these solutions are kept in an inert gas atmosphere or a nitrogen atmosphere, and the rates of their flow into the reaction chamber 12 are controlled by a conductive bridge 13. Upon reaction of the aforesaid two solutions together a reactant mass containing aluminum hydride, $AlH_3$, and a precipitate of lithium chloride, $LiCl$, is formed. The reactant mass is caused to flow through the conduit 14 into the filter 15 in which the lithium chloride precipitate is separated from the filtrate containing the unstable aluminum hydride. The aluminum hydride containing filtrate is then conveyed through the line 16 into a storage tank 17 from whence it flows through the line 18 into a container 19 housed in a closed chamber 20. Nitrogen gas from the tank 21 is caused to flow through the line 22 into the chamber 20 and thence out of the outlet 23. The circulation of the nitrogen gas through the chamber 20 is continued throughout the operation of the process of the present invention, and this nitrogen gas containing chamber constitutes an inert atmosphere.

Disposed within and spaced from the closed chamber 20 is another closed chamber 24 in which is housed a continuously rotated large heating drum 25. The closed chamber 24 is provided with a conduit 26 which is attached to a vacuum pump, not shown, the purpose of the pump being to evacuate the chamber 24 and to withdraw the liberated hydrogen gas from the chamber 24. The evacuated chamber 24 constitutes an evacuated atmosphere.

The material to be coated with a film of the aluminum metal may be either paper, a textile, or a plastic. Preferably, the material to be coated is in the form of a web and wound upon a spool. As shown in the accompanying drawing, the web of material 30 is caused to be unrolled from the roll 31 and to travel through the feed rolls 32 into the chamber 20. From the feed rolls 32 the web of material is drawn over the guide roll 33, and thence in between the coating rolls 34. In its passage between the coating rolls 34, the aluminum hydride containing filtrate in the container 19 is caused to be applied to the adjacent surface of the traveling web of material by means of the one roll of the coating rolls 34 partially submerged in the aluminum hydride containing filtrate in the container 19. From the coating rolls 34, the traveling web of material is caused to be drawn into the closed chamber 24 by means of the feed rolls 35, thence about the drum 25, thence through the feed rolls 36, thence through the feed rolls 37, and thence wound about the roll 38.

The heating drum 25 is heated to a temperature for decomposing the unstable aluminum hydride at or from 75° to 250° centigrade or higher, the specific temperature being determined by the heat resistance of the web upon which the aluminum hydride has been coated. As the web of material travels about the heated drum 25 the aluminum hydride is decomposed into the metal aluminum and hydrogen gas, the aluminum metal being caused to be deposited in the form of a coating on such web and the liberated hydrogen gas being withdrawn from the chamber 24 through the conduit 26.

The web of material thus treated has a coating or a film of aluminum metal thereon which exhibits a shiny reflective surface free of smokiness. Also, the aluminum metal of the coating is in its original or natural color.

Having thus described the invention what is new and desired to be secured by Letters Patent is:

1. In a process for making an aluminum metal coated material, the steps of coating an aluminum hydride onto a base material in an inert atmosphere, and subjecting said material to a temperature for decomposing said hydride to cause deposition of the aluminum metal in the form of a coating on said material.

2. In a process for making an aluminum metal coated material, the steps of coating an aluminum hydride onto a base material in an inert atmosphere, and subjecting said material in an evacuated atmosphere to a temperature for decomposing said hydride to cause deposition of the aluminum metal in the form of a coating on said material.

3. In a process for making an aluminum metal coated material, the steps of coating an aluminum hydride onto a base material in an inert atmosphere, subjecting said material in an evacuated atmosphere to a temperature for decomposing said hydride to cause deposition of the aluminum metal in the form of a coating on said material, and withdrawing the liberated hydrogen gas from the evacuated atmosphere.

4. The process of making an aluminum metal coated material which comprises reacting together lithium aluminum hydride and aluminum chloride in stoichiometric amounts to obtain a reactant mass containing aluminum hydride and lithium chloride as a precipitate, separating the lithium chloride precipitate from said mass, coating the aluminum hydride containing filtrate onto a base material in an inert atmosphere, and subjecting said material in an evacuated atmosphere to a temperature for decomposing said aluminum hydride to cause deposition of the metal aluminum in the form of a coating on said material while withdrawing the liberated hydrogen gas.

5. The process for making an aluminum metal coated material which comprises reacting together lithium aluminum hydride and aluminum chloride in stoichiometric amounts to obtain a reactant mass containing aluminum hydride and lithium chloride as a precipitate, separating the lithium chloride precipitate from said mass, applying the aluminum hydride containing filtrate to a traveling web of material in an inert atmosphere, and subjecting said web of material in an evacuated atmosphere to a temperature for decomposing said aluminum hydride to cause deposition of the metal aluminum in the form of a coating on said material while withdrawing the liberated hydrogen gas.

References Cited in the file of this patent

UNITED STATES PATENTS

| | | |
|---|---|---|
| 2,351,798 | Alexander | June 20, 1944 |
| 2,567,972 | Schlesinger | Sept. 18, 1951 |

FOREIGN PATENTS

| | | |
|---|---|---|
| 58,278 | France | June 17, 1953 |

OTHER REFERENCES

Wein: "Metallizing Non-Conductors," published by Metal Ind. Pub. Co., New York, 1945, p. 44. (Copy in Div. 25, 117–35.)

Marboe: "The Glass Industry," vol. 26, No. 3, March 1945, pp. 142 and 149. (Copy in Div. 25, 117–35.)

Hurd: "Chemistry of the Hydrides," John Wiley & Sons, 1952 (pages 97 and 98 relied on). (Copy in Scientific Library.)